US012351443B2

(12) United States Patent
Liu

(10) Patent No.: US 12,351,443 B2
(45) Date of Patent: Jul. 8, 2025

(54) CAN OPENER WITH ADAPTATION FUNCTION

(71) Applicant: Wang Liu, Xinhua (CN)

(72) Inventor: Wang Liu, Xinhua (CN)

( * ) Notice: Subject to any disclaimer, the term of this patent is extended or adjusted under 35 U.S.C. 154(b) by 133 days.

(21) Appl. No.: 18/358,980

(22) Filed: Jul. 26, 2023

(65) Prior Publication Data

US 2024/0002205 A1 Jan. 4, 2024

(30) Foreign Application Priority Data

Apr. 24, 2023 (CN) ........................ 202310475701.X

(51) Int. Cl.
*B67B 7/00* (2006.01)

(52) U.S. Cl.
CPC .................................... *B67B 7/385* (2013.01)

(58) Field of Classification Search
CPC ......... B27B 7/385; B25B 21/02; B25B 21/06; B25F 5/02; B67B 7/38
USPC ......... 30/423, 416, 417, 426, 427, 410, 400, 30/418, 421
See application file for complete search history.

(56) References Cited

U.S. PATENT DOCUMENTS

| | | | | |
|---|---|---|---|---|
| 2,565,144 A * | 8/1951 | Mclean | B67B 7/34 30/422 |
| 6,845,562 B2 * | 1/2005 | Evans | B67B 7/36 30/433 |
| 7,213,340 B1 * | 5/2007 | Lee | B67B 7/385 30/434 |
| 7,596,874 B2 * | 10/2009 | Mah | B67B 7/34 30/422 |
| 8,443,518 B2 * | 5/2013 | Fisher | B26B 15/00 30/2 |
| 9,352,947 B2 * | 5/2016 | Mah | B67B 7/34 |
| 9,630,825 B1 † | 4/2017 | Lee | |
| 2001/0042312 A1 | 11/2001 | So | |
| 2004/0064957 A1 | 4/2004 | So | |
| 2006/0064883 A1 | 3/2006 | So | |
| 2013/0276313 A1 * | 10/2013 | Zhou | A01G 3/037 30/228 |

(Continued)

FOREIGN PATENT DOCUMENTS

EP 0855363 A1 † 7/1998

OTHER PUBLICATIONS

Morole Electric Can Opener (Amazon Webpages), Amazon, Date First Available: Mar. 16, 2023.†

*Primary Examiner* — Ghassem Alie
(74) *Attorney, Agent, or Firm* — Zhigang Ma

(57) ABSTRACT

The present disclosure discloses a can opener with an adaptation function, including a shell assembly; a circuit board and a speed reduction transmission assembly which are separately arranged in the shell assembly; an eccentric assembly movably penetrating through the shell assembly, wherein the eccentric assembly is in meshing and transmission connection with the speed reduction transmission assembly; an integrated knife flywheel penetrating through the shell assembly and detachably arranged on the eccentric assembly, wherein the integrated knife flywheel includes an integrally formed integrated knife flywheel main body, a resisting slot body, and a cutting tool body; the knife flywheel main body is in a slope design; the resisting slot body is an annular slot; the cutting tool body is a ring tool.

10 Claims, 12 Drawing Sheets

(56) References Cited

U.S. PATENT DOCUMENTS

2014/0059869 A1 * 3/2014 Lee ......................... B67B 7/385
30/416

* cited by examiner
† cited by third party

CAN OPENER WITH ADAPTATION FUNCTION

TECHNICAL FIELD

The present disclosure relates to the technical field of can openers, and in particular, to a can opener with an adaptation function.

BACKGROUND

According to an existing can opening tool, a cutting tool is usually attached to a handle to cut open a connection edge of a can body. However, a user needs to turn the handle with a lot of strength, and needs to hold the can with one hand and operate the cutting tool with the other hand to cut open the connection edge of the can body. This can opening manner is laborious and inconvenient to operate.

The patent No. CN106672875A provides a can opener, which includes an upper seat, a lower seat, a transmission device, an eccentric wheel, a roller, a connection piece, a gasket, a traction wheel, and a metal plate. When the first switch is pressed, power of a motor is conveyed through a gear and the transmission device to a large gear, and causes the eccentric wheel to rotate. Due to the rotation of the eccentric wheel itself, a distance between a mandrel of the roller and a shaft core of the eccentric wheel increases, so that a distance between a pointed gear and the traction wheel to be shortened to automatically open a can. At the same time, a shaft core of the pointed gear moves outward, which tensions a torsion spring. At this time, a torque of the torsion spring is less than a resistance of opening the can. When the resistance after the can opening is completed is less than the torque of the torsion spring, a counter-acting force of the torsion spring causes the shaft core of the pointed gear to move inwards, causing the pointed gear to be separated from the traction wheel. When the shaft core of the pointed gear moves and touches the second switch, the motor stops and completes an automatic can opening function. According to this solution, the pointed gear and the traction wheel cooperate with each other to perform an automatic can opening operation. Although this design can achieve convenient and labor-saving can opening operation, this structure cannot match can bodies with different sizes due to limitations on the traction wheel. Therefore, an integrated knife flywheel and a can opener are provided to solve the problem that the can opener in the prior art cannot match different can bodies.

SUMMARY

One objective of the present disclosure is to provide a can opener with an adaptation function, so as to solve the problem that a can opener in the prior art cannot match different can bodies.

The can opener with the adaptation function of the present disclosure can be achieved by the following technical solutions:

The present disclosure provides a can opener with an adaptation function, including a shell assembly, which is a hollow cavity; a circuit board and a speed reduction transmission assembly which are separately arranged in the shell assembly; an eccentric assembly movably penetrating through the shell assembly, wherein the eccentric assembly is in meshing and transmission connection with the speed reduction transmission assembly; an integrated knife flywheel penetrating through the shell assembly and detachably arranged on the eccentric assembly, wherein the integrated knife flywheel includes an integrally formed integrated knife flywheel main body, a resisting slot body, and a cutting tool body; the knife flywheel main body is in a slope design; the resisting slot body is an annular slot; the cutting tool body is a ring tool; a through hole penetrates through the knife flywheel main body, the resisting slot body, and the cutting tool body in sequence; and a key assembly arranged on the shell assembly in a penetrating manner and electrically connected to the circuit board.

In one implementation, the speed reduction transmission assembly includes a motor, a transmission gear, a speed reduction mechanism, a drive gear, and a synchronizer gear; the motor is arranged in the shell assembly; the transmission gear is fixedly arranged on a rotating shaft of the motor; the speed reduction mechanism is in meshing and transmission connection with the transmission gear; the drive gear is in meshing connection with the speed reduction mechanism and is connected to the eccentric assembly; and the synchronizer gear is in meshing connection with the drive gear and the eccentric assembly respectively.

In one implementation, the speed reduction mechanism includes a multi-reduction gear structure.

In one implementation, the eccentric assembly includes a fixed block, an eccentric wheel, a limiting block, and a gear shaft; the fixed block is fixedly arranged in the shell assembly; the eccentric wheel movably penetrates through the fixed block and is in meshing connection with the synchronizer gear; the limiting block is arranged on a side edge of the fixed block, and a sliding chute is formed in the limiting block in a penetrating manner; the gear shaft penetrates through the eccentric wheel, the fixed block, the limiting block, and a guide block in sequence and is connected to the drive gear; and the eccentric wheel can drive the gear shaft to move in the sliding chute.

In one implementation, the eccentric assembly further includes the guide block; and the guide block is movably arranged on a side edge of the limiting block and guides and limits the gear shaft.

In one implementation, the gear shaft includes a shaft sleeve, a rotating shaft main body, and a traction wheel; the shaft sleeve penetrates through the eccentric wheel, the fixed block, the limiting block, and the guide block in sequence; the rotating shaft main body is movably arranged on the shaft sleeve in a penetrating manner and is connected to the drive gear; and the traction wheel is fixedly arranged on one side of the rotating shaft main body.

In one implementation, a plurality of racks are arranged on a side edge of the eccentric wheel; the plurality of racks are uniformly arranged; and the synchronizer gear is in meshing and transmission connection with the plurality of racks.

In one implementation, the integrated knife flywheel is detachably connected to the eccentric assembly through a connection assembly; the connection assembly includes a knife flywheel jack post and two fastening screws; the knife flywheel jack post penetrates through the integrated knife flywheel through the through hole; and the two fastening screws are separately arranged on two sides of the knife flywheel jack post.

In one implementation, the can opener with the adaptation function of the present disclosure further includes a battery assembly; the battery assembly is fixedly arranged in the shell assembly and is electrically connected to the circuit board.

In one implementation, when the battery assembly is a rechargeable battery, the circuit board is provided with a charging interface; and the charging interface penetrates through the shell assembly to charge the battery assembly.

Compared with the prior art, the can opener with the adaptation function of the present disclosure has the beneficial effects:

According to the can opener with the adaptation function of the present disclosure, the detachably connected integrated knife flywheel with a large slope can match can bodies with different sizes, which effectively solves the problem that the can opener in the prior art cannot match different can bodies and facilitates replacement and maintenance of the knife flywheel.

According to the can opener with the adaptation function of the present disclosure, a leading angle with a certain value and a knife angle with a certain value are respectively arranged on the resisting slot body and the cutting tool body, so that a cutting operation of the knife flywheel is more stable, and few burrs are generated in a cutting process.

According to the can opener with the adaptation function of the present disclosure, the synchronizer gear is in meshing and transmission connection with the eccentric wheel, and the eccentric wheel drives the gear shaft to move in the sliding chute through an eccentric force, so that the traction wheel in the gear shaft moves towards the integrated knife flywheel, and the drive gear drives the traction wheel to rotate. Due to the cooperation between the traction wheel and the integrated knife flywheel, the cutting operation is effectively performed on a can body.

BRIEF DESCRIPTION OF THE DRAWINGS

In order to explain the technical solutions of the embodiments of the present disclosure more clearly, the following will briefly introduce the accompanying drawings used in the embodiments. It should be understood that the drawings in the following description only illustrate some embodiments of the present disclosure and thus shall not be deemed as limiting the scope. Those of ordinary skill in the art can obtain other related drawings based on these drawings without creative work.

Figure 1:
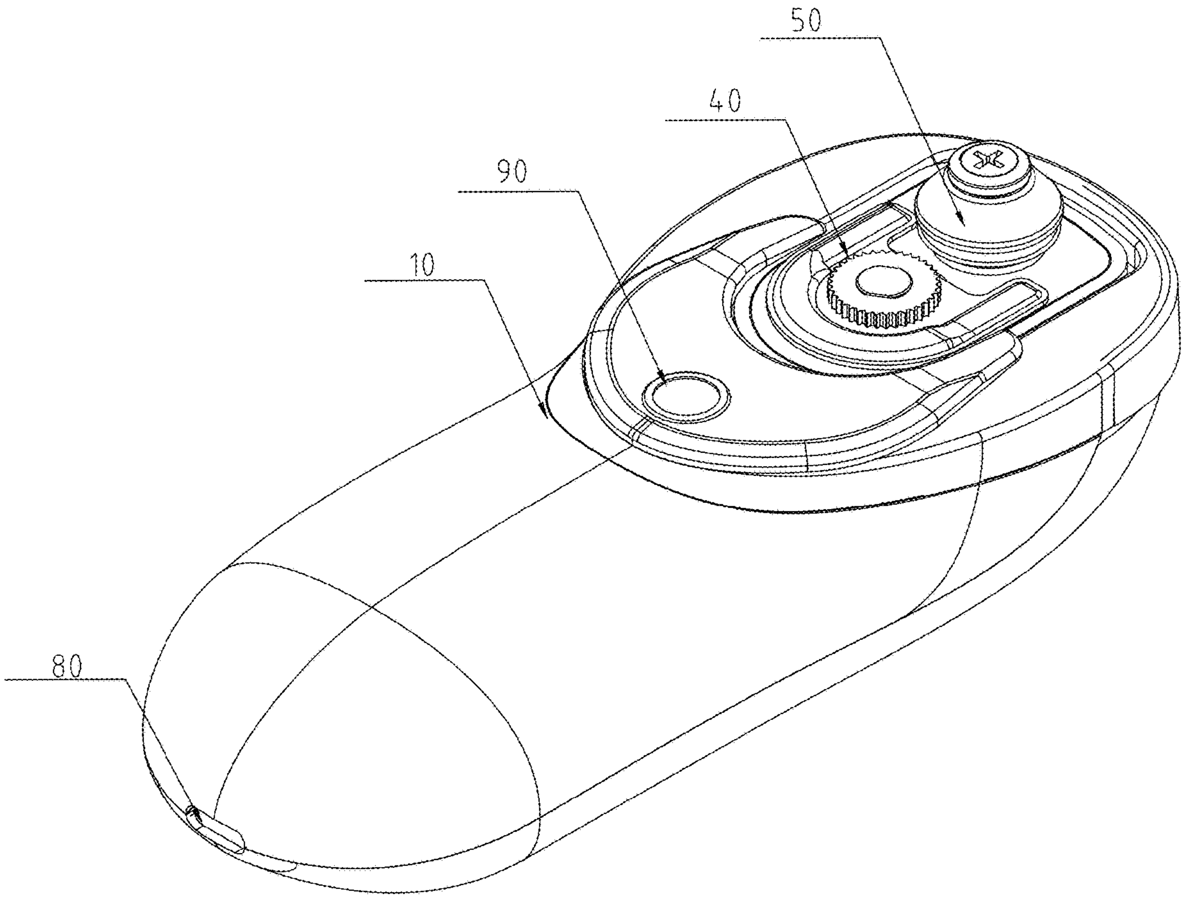
FIG. 1 is a schematic structural diagram of a can opener with an adaptation function according to the present disclosure.
Figure 2:
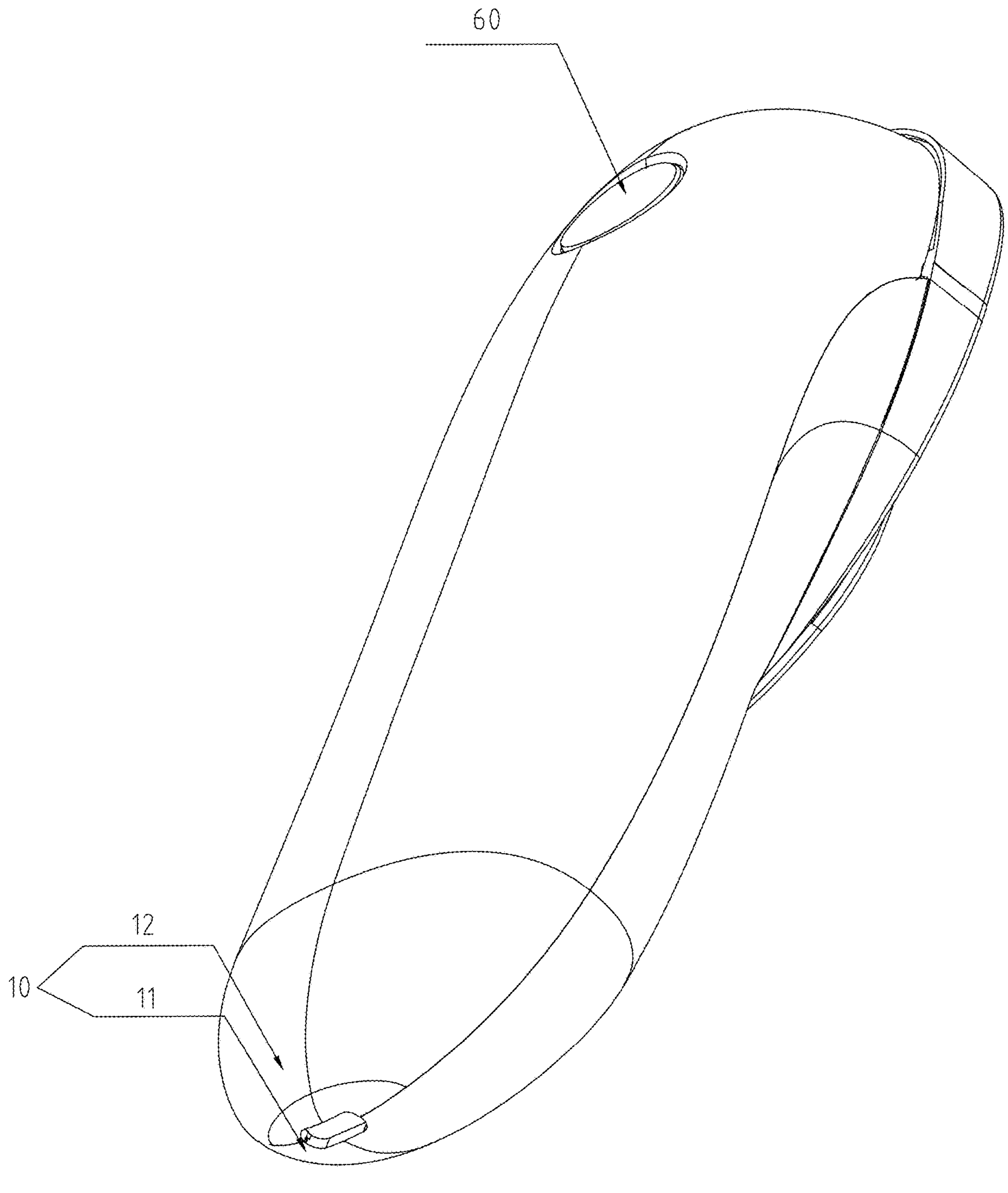
FIG. 2 is a schematic structural diagram of another view of the can opener with the adaptation function of the present disclosure shown in FIG. 1.

Numerals in the drawings: 10: shell assembly; 11: lower shell; 12: upper shell; 121: key hole; 20: circuit board; 30: speed reduction transmission assembly; 31: motor; 32: transmission gear; 33: speed reduction mechanism; 34: drive gear; 35: synchronizer gear; 40: eccentric assembly; 41: fixed block; 411: shaft hole; 412: first through hole; 42: eccentric wheel; 421: rack; 422: eccentric shaft hole; 43: limiting block; 431: sliding chute; 432: second through hole; 44: gear shaft; 441: shaft sleeve; 442: rotating shaft main body; 443: traction wheel; 45: guide block; 451: third through hole; 452: gap; 50: integrated knife flywheel; 501: knife flywheel main body; 502: resisting slot body; 5021: guide angle; 503: cutting tool body; 5031: knife angle; 504: through hole; 51: connection assembly; 511: knife flywheel jack post; 512: fastening screw; 60: key assembly; 61: key plate; 62: key shell; 70: battery assembly; 80: charging interface; 90: magnet assembly; 91: magnet fixing plate; and 92: magnet.

DETAILED DESCRIPTION OF THE EMBODIMENTS

In order to make the objectives, technical solutions and advantages of the embodiments of the present disclosure clearer, the technical solutions in the embodiments of the present disclosure will be described clearly and completely below in combination with the drawings in the embodiments of the present disclosure. Obviously, the embodiments described herein are part of the embodiments of the present disclosure, not all the embodiments. The components of the embodiments of the present disclosure generally described and shown in the drawings here can be arranged and designed in a variety of different configurations.

Therefore, the following detailed description for the embodiments of the present disclosure provided in the accompanying drawings is not intended to limit the scope of the claimed present disclosure, but merely represents selected embodiments of the present disclosure. All other embodiments obtained by those of ordinary skill in the art based on the embodiments in the present disclosure without creative work shall fall within the protection scope of the present disclosure.

Referring to FIG. 1 to FIG. 5, the present disclosure provides a can opener with an adaptation function. The can opener may include a shell assembly 10, a circuit board 20, a speed reduction transmission assembly 30, an eccentric assembly 40, an integrated knife flywheel 50, a key assembly 60, a battery assembly 70, and a charging interface 80. The shell assembly 10 is a hollow cavity. The circuit board 20 and the speed reduction transmission assembly 30 are separately arranged in the shell assembly 10. The circuit board 20 is electrically connected to the speed reduction transmission assembly 30, the key assembly 60, the battery assembly 70, and the charging interface 80 respectively. The speed reduction transmission assembly 30 is in meshing connection with the eccentric assembly 40, and drives the eccentric assembly 40 to rotate. The eccentric assembly 40 is movably arranged in the shell assembly 10, penetrates through the shell assembly 10, and is in meshing and transmission connection with the speed reduction transmission assembly 30. The integrated knife flywheel 50 penetrates through the shell assembly 10 and is detachably connected to the eccentric assembly 40, and a cutting operation is performed on a can body through the integrated knife flywheel 50. The key assembly 60 is arranged on the shell assembly 10 in a penetrating manner, and controls on, off, and rotating speed adjustment of the speed reduction transmission assembly 30. The battery assembly 70 is fixedly arranged in the shell assembly 10, and provides electric energy to the circuit board 20, the speed reduction transmission assembly 30, and the key assembly 60. The charging interface 80 is fixedly arranged on the circuit board 20 and penetrates through the shell assembly 10. The battery assembly 70 is charged through the charging interface 80.

Referring to FIG. 1 to FIG. 5, in this embodiment, the shell assembly 10 includes a lower shell 11 and an upper shell 12. The upper shell 12 is fixedly arranged above the lower shell 11 through a fastener structure or a screw structure to form a hollow cavity. The circuit board 20, the speed reduction transmission assembly 30, the eccentric assembly 40, and the battery assembly 70 are respectively arranged in the cavity. A key hole 121 is arranged on the upper shell 12 in a penetrating manner. The key assembly 60 penetrates through the shell assembly 10 through the key hole 121. In other embodiments, the key hole 121 may also be arranged on the lower shell 11 in a penetrating manner. In this embodiment, a plurality of fixed pillars are arranged in the lower shell 11 and the upper shell 12 respectively. The circuit board 20, the speed reduction transmission assembly 30, the eccentric assembly 40, and the battery assembly 70 are respectively arranged in the shell assembly 10 through the corresponding fixed pillars.

Figure 3:
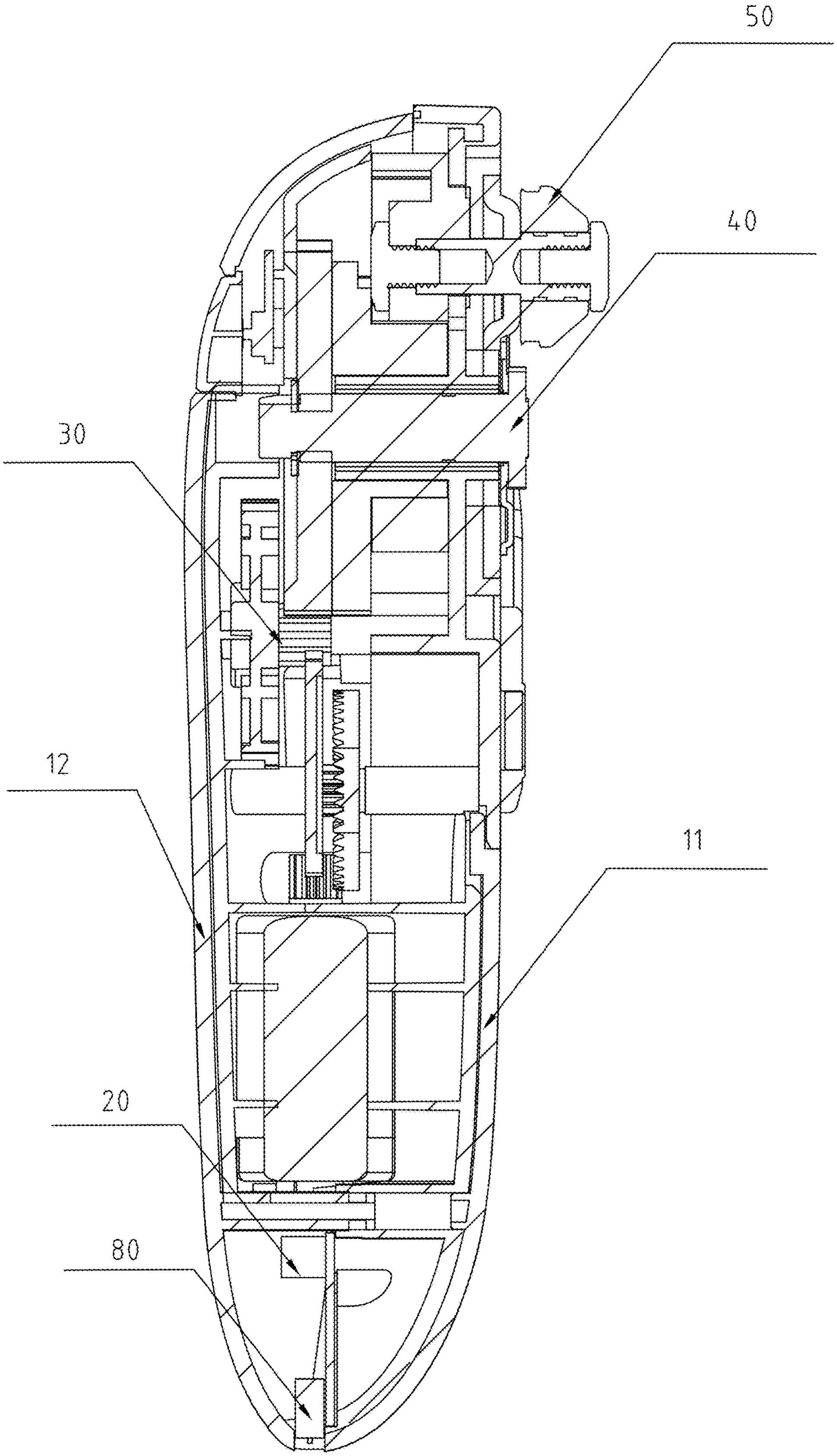
FIG. 3 is a schematic structural diagram of a cross section of the can opener with the adaptation function of the present disclosure shown in FIG. 1.
Figure 4:
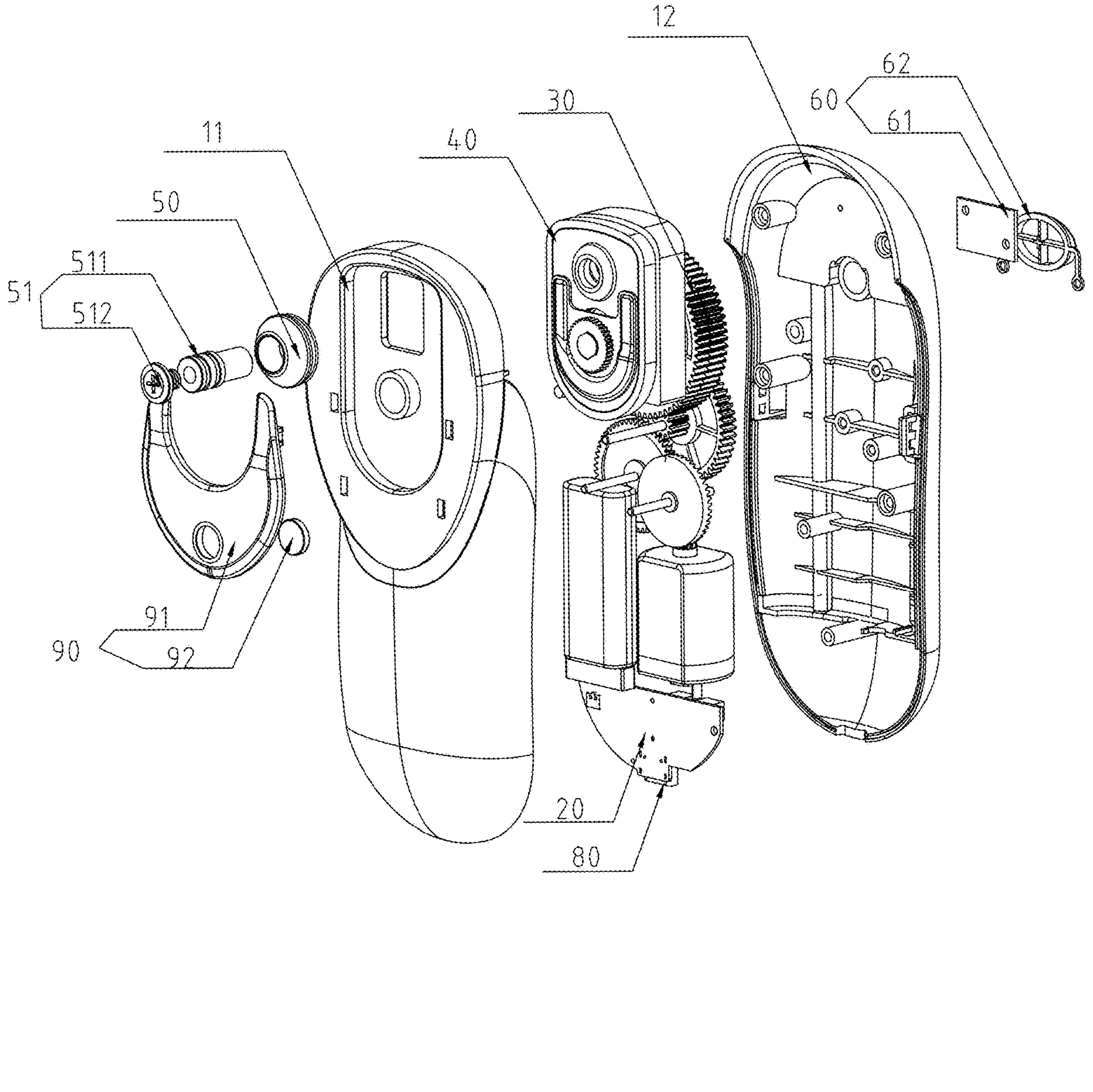
FIG. 4 is an exploded structural diagram of the can opener with the adaptation function of the present disclosure shown in FIG. 1.
Figure 5:
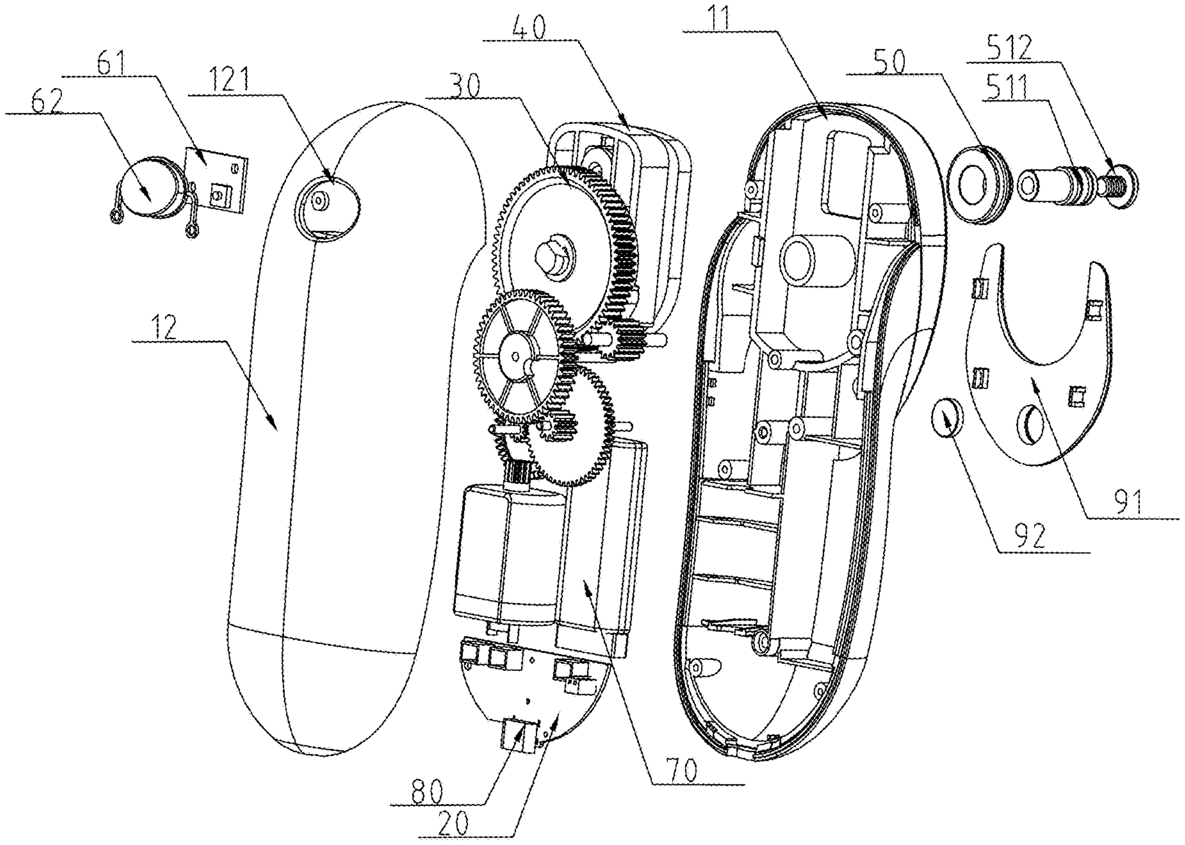
FIG. 5 is an exploded structural diagram of another view of the can opener with the adaptation function of the present disclosure shown in FIG. 1, including a speed reduction transmission assembly, an eccentric assembly, and an integrated knife flywheel.
Figure 6:
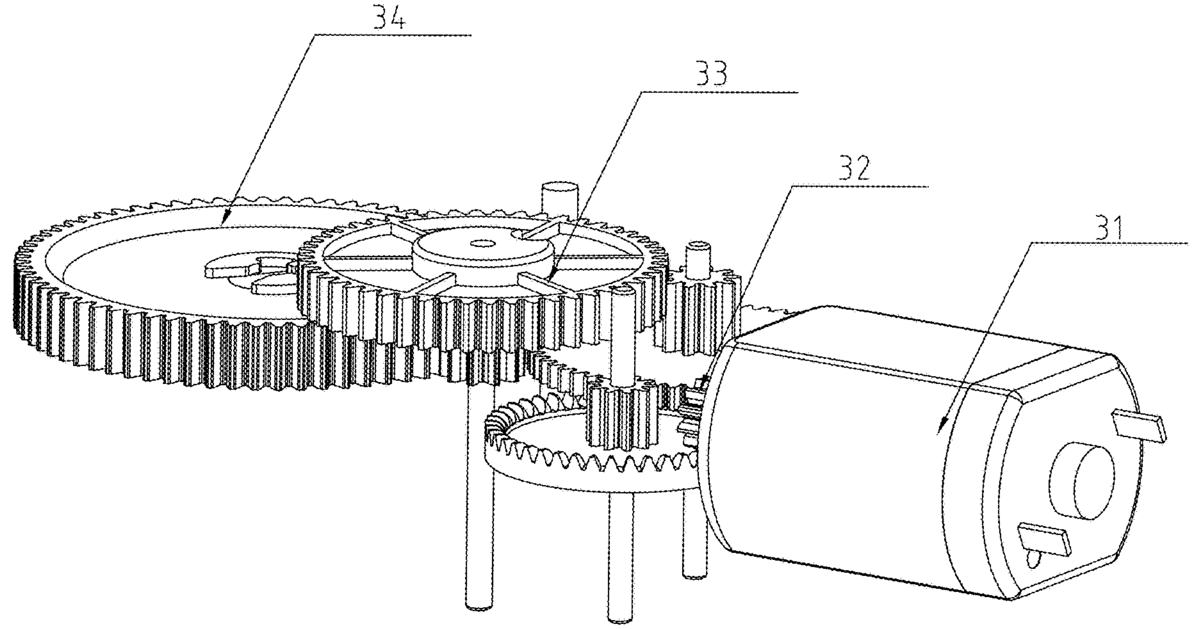
FIG. 6 is a schematic structural diagram of the speed reduction transmission assembly in the can opener with the adaptation function of the present disclosure shown in FIG. 5.
Figure 7:
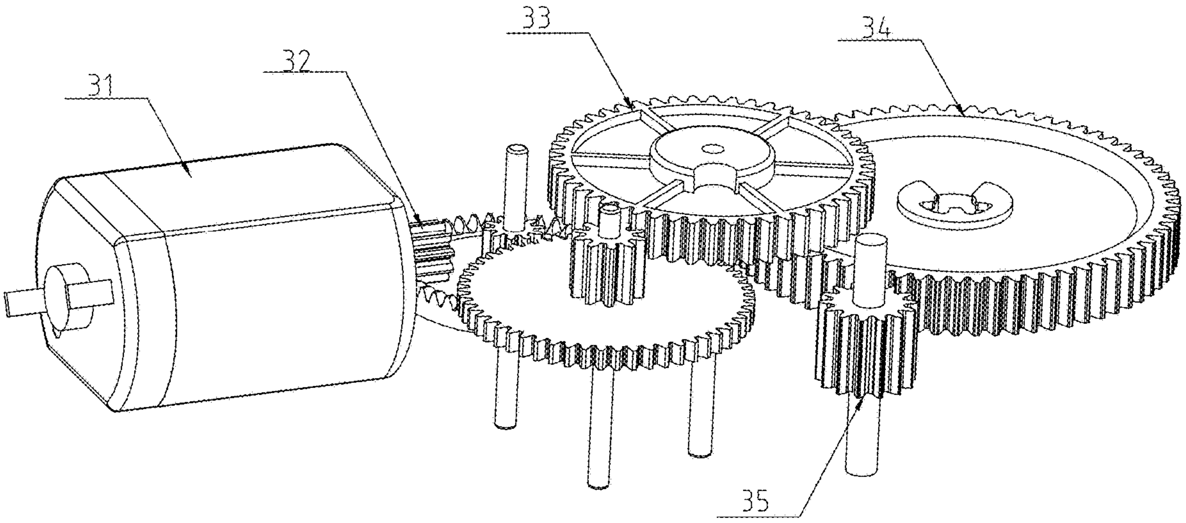
FIG. 7 is a schematic structural diagram of another view of the speed reduction transmission assembly in the can opener with the adaptation function of the present disclosure shown in FIG. 5.

Referring to FIG. 3 to FIG. 5, in this embodiment, the circuit board 20 is electrically connected to the speed reduction transmission assembly 30, the key assembly 60, the battery assembly 70, and the charging interface 80. A control technology adopted is the existing art, so a specific control process and model numbers are not repeatedly described here. In some embodiments, the circuit board 20 is further provided with a wireless communication module. The wireless communication module can be wirelessly connected to an electronic terminal. A user can wirelessly control operations of the can opener using an application program or a mini program on the electronic terminal. Specifically, the wireless communication module can be one or more of a WiFi wireless communication module, a Bluetooth wireless communication module, a 4G wireless communication module, and a 5G wireless communication module. In some other embodiments, the circuit board 20 is further provided with an angle sensor. A rotating angle of the can opener is measured through the angle sensor. If the can opener rotates 360 degrees to complete a can opening operation, the angle sensor transmits a signal to the circuit board 20, and the circuit board 20 controls the speed reduction transmission assembly 30 to stop work. The angle sensor also adopts the prior art, so that a specific measurement process and a specific product model number of the angle sensor will not be repeatedly described.

Referring to FIG. 4 to FIG. 7, in this embodiment, the speed reduction transmission assembly 30 includes a motor 31, a transmission gear 32, a speed reduction mechanism 33, a drive gear 34, and a synchronizer gear 35. The motor 31 is arranged in the shell assembly 10. The transmission gear 32 is arranged on a rotating shaft of the motor 31, and rotates as the rotating shaft rotates. The speed reduction mechanism 33 is in meshing and transmission connection with the transmission gear 32. The transmission gear 32 drives the speed reduction mechanism 33 to rotate, and a function of the speed reduction mechanism 33 is to reduce a rotating speed and increase a torsion moment. The drive gear 34 is in meshing connection with the speed reduction mechanism 33 and is connected to the eccentric assembly 40. The drive gear is driven by the speed reduction mechanism 33 to drive a gear shaft 44 in the eccentric assembly 40 to rotate. The synchronizer gear 35 is in meshing connection with the drive gear 34 and the eccentric assembly 40 respectively. The drive gear 34 drives the synchronizer gear 35 to rotate. The synchronizer gear 35 synchronously drives an eccentric wheel 42 in the eccentric assembly 40 to rotate. In this embodiment, the speed reduction mechanism 33 includes a multi-reduction gear structure. The rotating speed of the motor 31 is reduced through the multi-reduction gear structure, and the torsion moment is increased through the multi-reduction gear structure at the same time.

Figure 8:
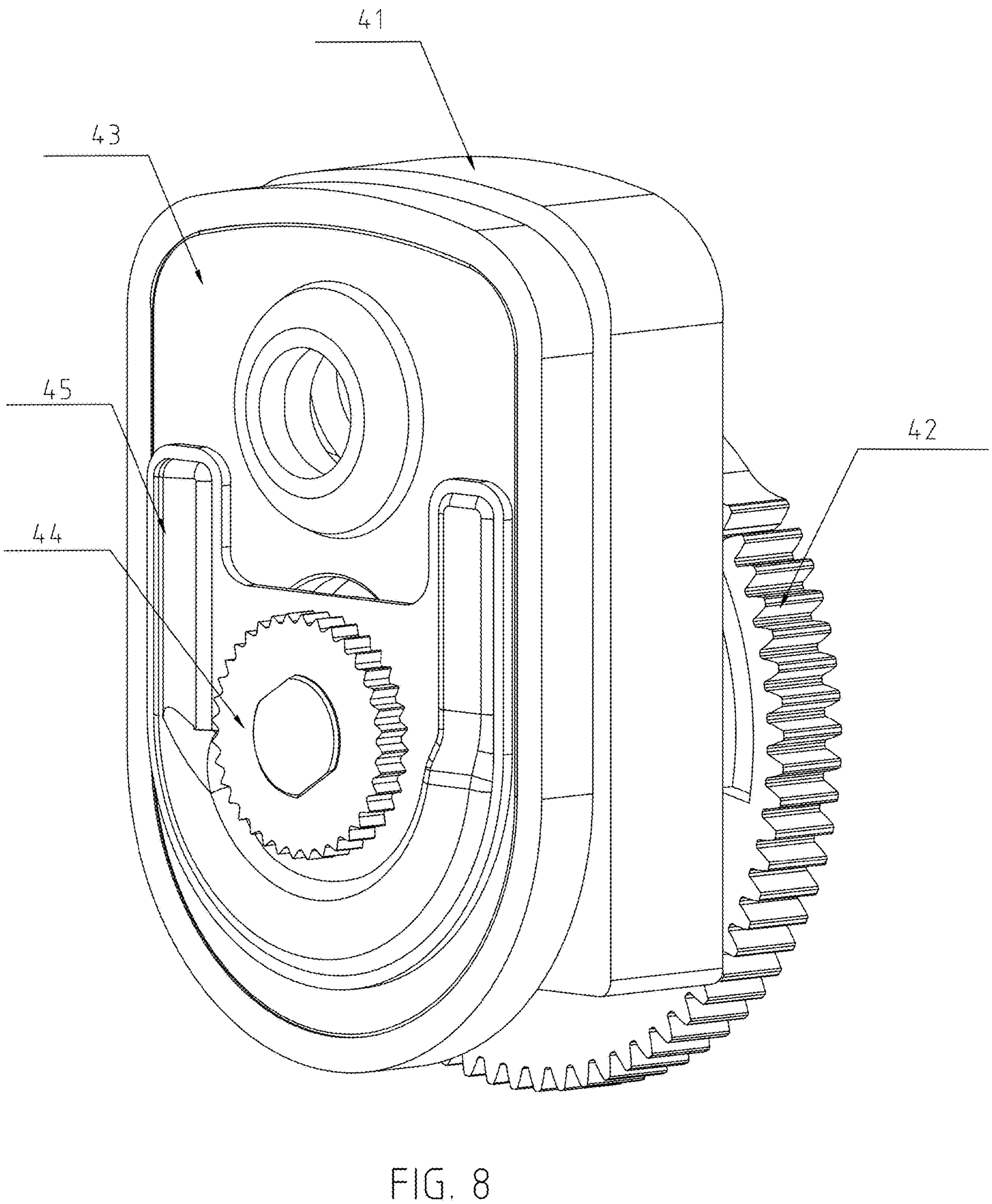
FIG. 8 is a schematic structural diagram of the eccentric assembly in the can opener with the adaptation function of the present disclosure shown in FIG. 5.
Figure 9:
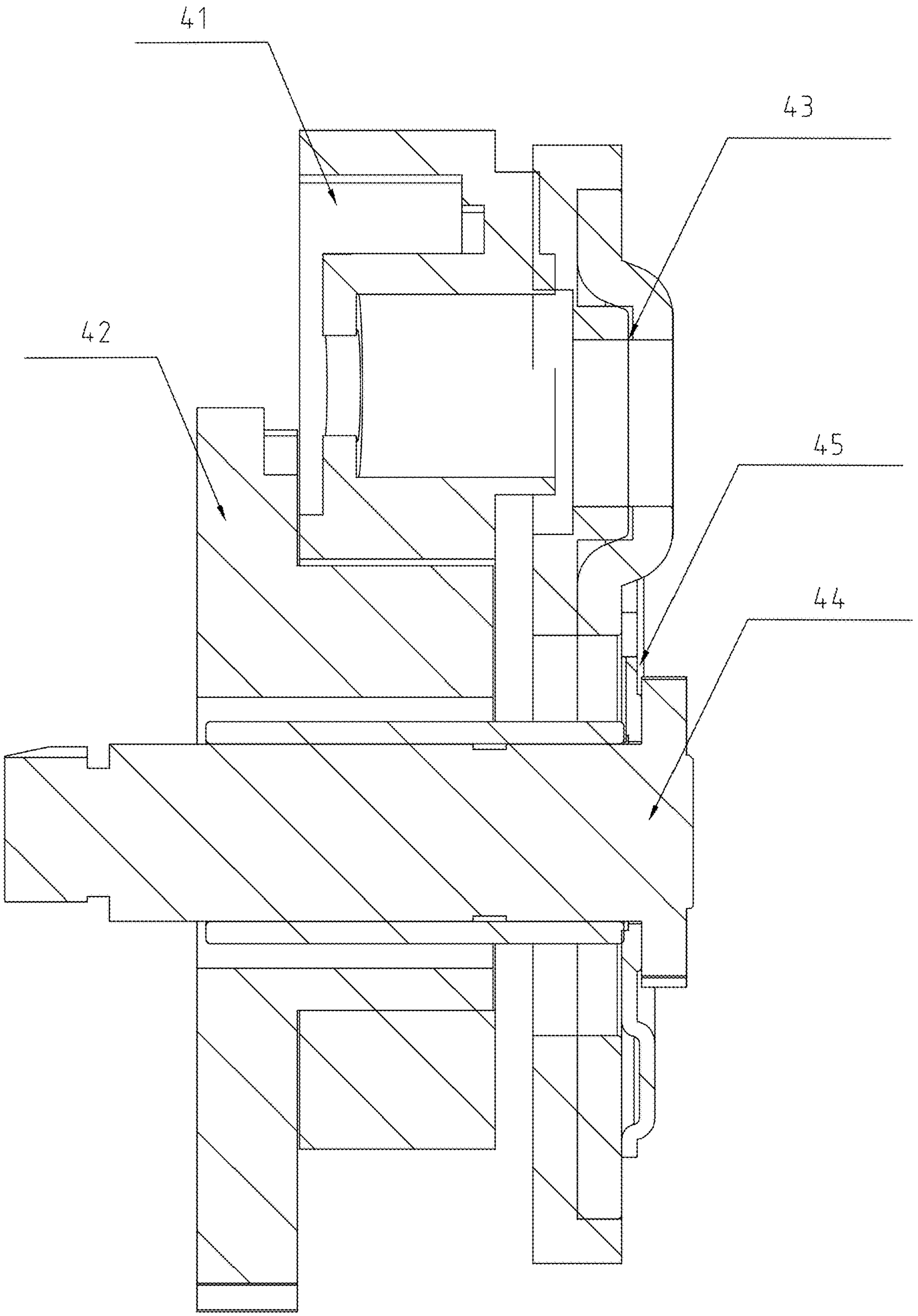
FIG. 9 is a schematic structural diagram of a cross section of the eccentric assembly shown in FIG. 8.
Figure 10:
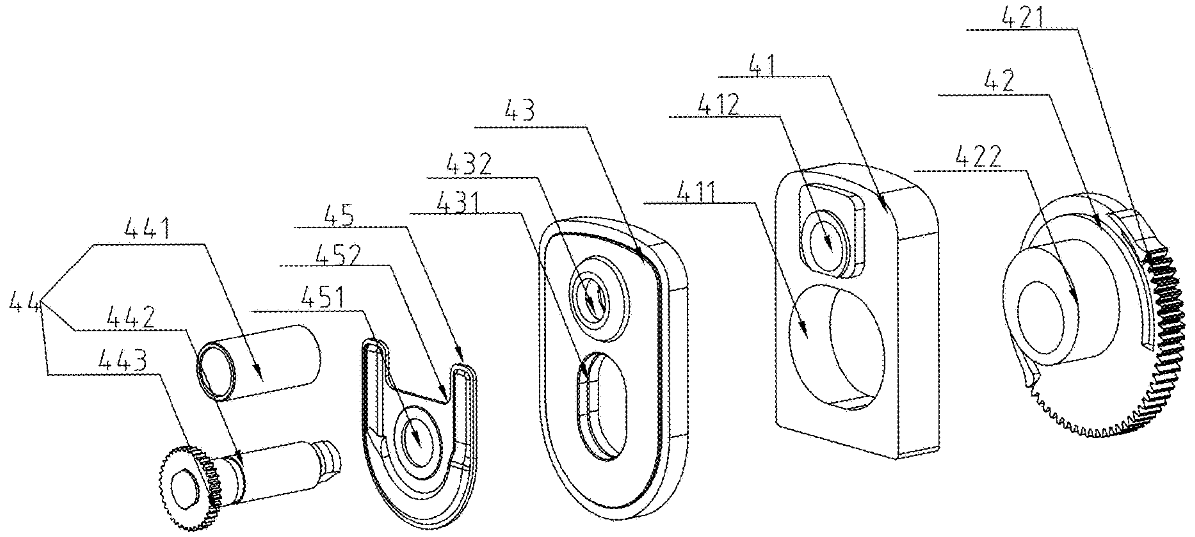
FIG. 10 is an exploded structural diagram of the eccentric assembly shown in FIG. 8.

Referring to FIG. 8 to FIG. 10, in this embodiment, the eccentric assembly 40 includes a fixed block 41, the eccentric wheel 42, a limiting block 43, the gear shaft 44, and a guide block 45. The fixed block 41 is fixedly arranged in the shell assembly 10. The eccentric wheel 42 movably penetrates through the fixed block 41 and can eccentrically rotate relative to the fixed block 41 under the driving of the speed reduction transmission assembly 30. The limiting block 43 is arranged on a side edge of the fixed block 41, and a sliding chute 431 is formed in the limiting block in a penetrating manner. The gear shaft 44 penetrates through the eccentric wheel 42, the fixed block 41, the limiting block 43, and the guide block 45 in sequence and is connected to the drive gear 34. The eccentric wheel 42 can drive the gear shaft 44 to move in the sliding chute 431. The guide block 45 is movably arranged on a side edge of the limiting block 43, and can be driven to move by the gear shaft 44.

Referring to FIG. 10, in this embodiment, a shaft hole 411 and a first through hole 412 are formed in the fixed block 41 in a penetrating manner. The eccentric wheel 42 is movably arranged on the fixed block 41 through the shaft hole 411, and can rotate in the shaft hole 411. The integrated knife flywheel 50 is arranged on the fixed block 41 in a penetrating manner through the first through hole 412. In this embodiment, a plurality of racks 421 are arranged on a side edge of the eccentric wheel 42. The plurality of racks 421 are uniformly arranged. The speed reduction transmission assembly 30 is in meshing and transmission connection with the plurality of racks 1211, thereby driving the eccentric wheel 42 to rotate. An eccentric shaft hole 422 is formed in the eccentric wheel 42 in a penetrating manner. The gear shaft 44 penetrates through the eccentric wheel 42 through the eccentric shaft hole 422. In this embodiment, the sliding chute 431 and a second through hole 432 are formed in the limiting block 43 in a penetrating manner. The sliding chute 431 is a linear slot body. The gear shaft 44 penetrates through the limiting block 43 through the sliding chute 431. The eccentric wheel 42 can drive the gear shaft 44 to move in the sliding chute 431 towards the second through hole 432. The integrated knife flywheel 50 is arranged on the limiting block 43 in a penetrating manner through the second through hole 432.

Referring to FIG. 10, in this embodiment, the gear shaft 44 includes a shaft sleeve 441, a rotating shaft main body 442, and a traction wheel 443. The shaft sleeve 441 penetrates through the eccentric wheel 42, the fixed block 41, the limiting block 43, and the guide block 45 in sequence. The rotating shaft main body 442 is movably arranged on the shaft sleeve 441 in a penetrating manner and is connected to the drive gear 34. The drive gear 34 drives the rotating shaft main body 442 to rotate. The traction wheel 443 is arranged on one side of the rotating shaft main body 442, and rotates as the rotating shaft main body 442 rotates. In this embodiment, the rotating shaft main body 442 and the traction wheel 443 are integrally formed. In other embodiments, the rotating shaft main body 442 and the traction wheel 443 may also be assembled.

Referring to FIG. 10, in this embodiment, a third through hole 451 and a gap 452 are formed in the guide block 45 in a penetrating manner. The gear shaft 44 penetrates through the guide block 45 through the third through hole 451. The gap 452 is formed in a side edge of the guide block 45 and corresponds to the position of the integrated knife flywheel 50, to guide and limit the movement of the gear shaft 44.

Figure 11:
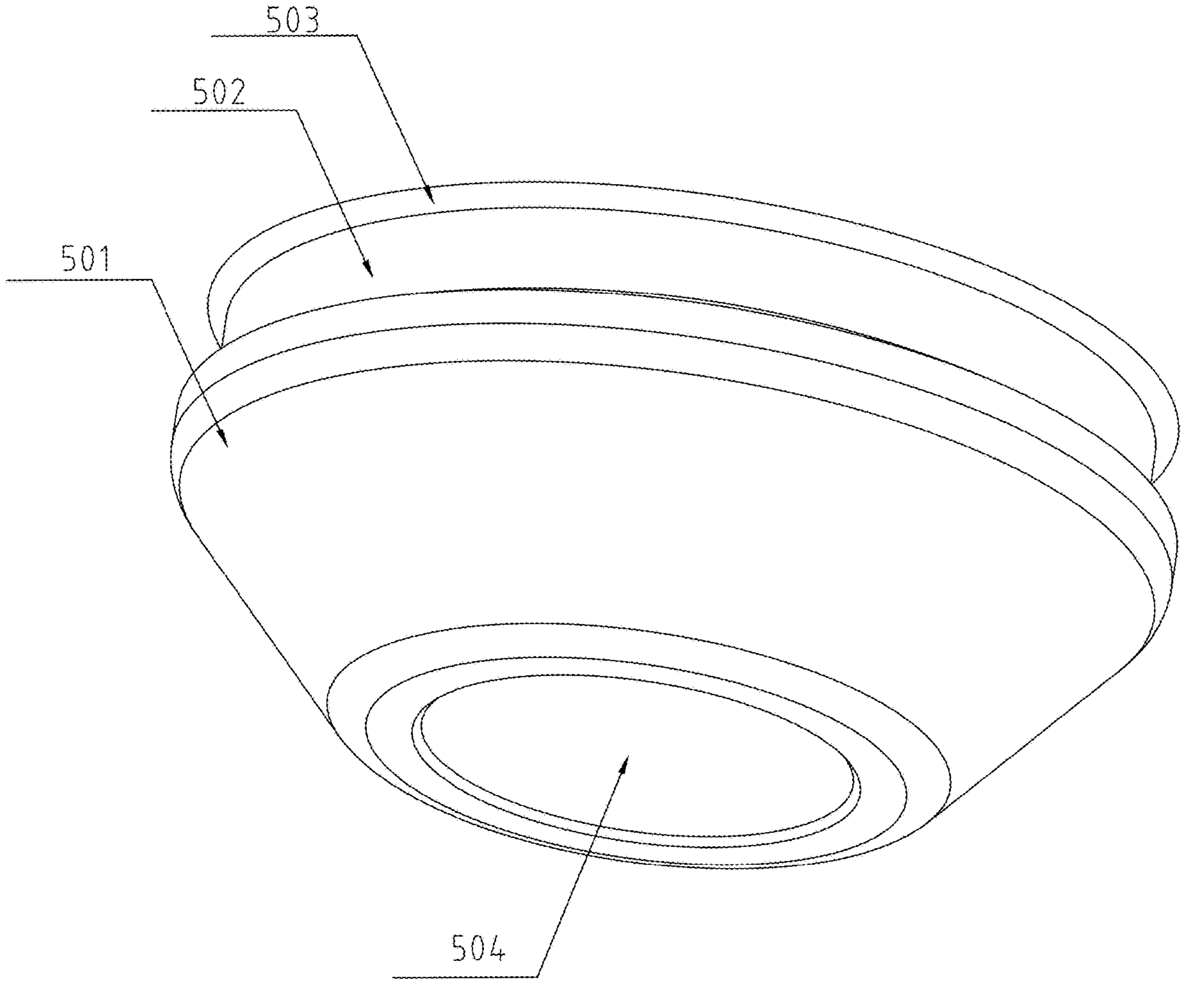
FIG. 11 is a schematic structural diagram of the integrated knife flywheel in the can opener with the adaptation function of the present disclosure shown in FIG. 5.
Figure 12:
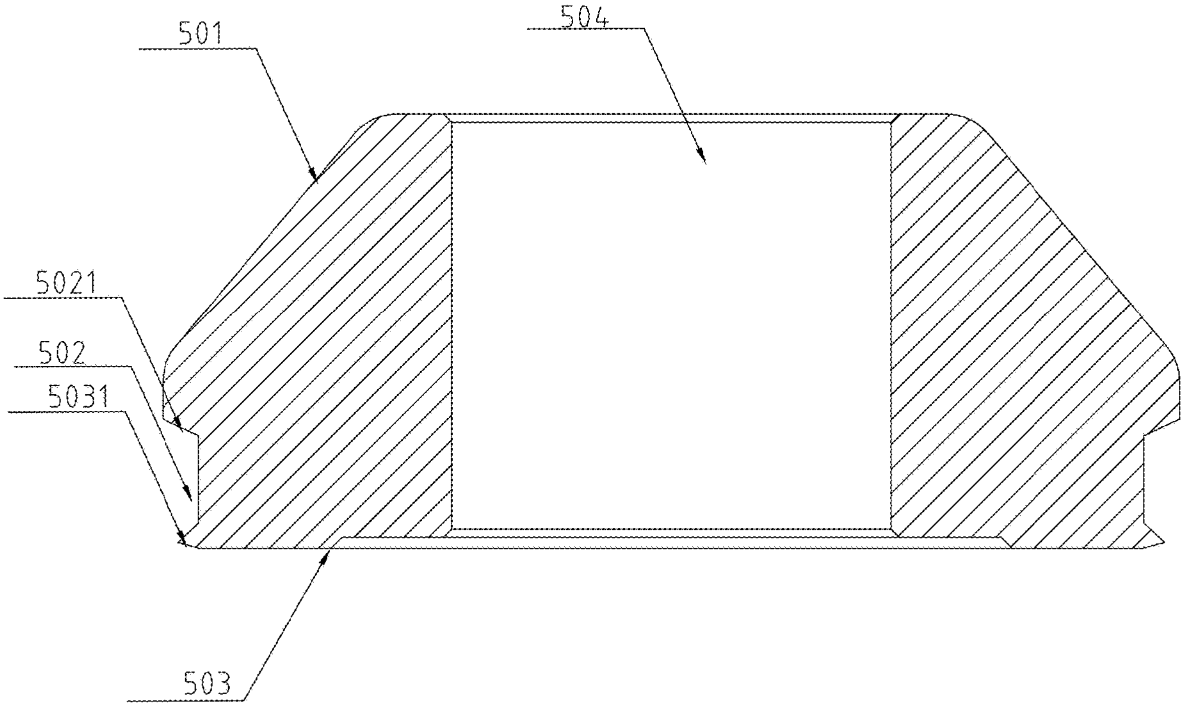
FIG. 12 is a schematic structural diagram of a cross section of the integrated knife flywheel shown in FIG. 11.

Referring to FIG. 11 and FIG. 12, in this embodiment, the integrated knife flywheel 50 may include an integrated knife flywheel main body 501, a resisting slot body 502, a cutting tool body 503, and a through hole 504. The knife flywheel main body 501, the resisting slot body 502, the cutting tool body 503, and the through hole 504 are integrally formed. In such a design, the knife flywheel is more stable in cutting. The knife flywheel main body 501 is a slope. In such a design, it is convenient for matching of can bodies with different sizes. The knife flywheel main body 501, the resisting slot body 502, and the cutting tool body 503 are arranged in sequence. The resisting slot body 502 is an annular slot, a function of which is to facilitate abutment of a rim of the can body. The cutting tool body 503 is a ring tool, which performs the cutting operation on the can body. The through hole 504 penetrates through the knife flywheel main body 501, the resisting slot body 502, and the cutting tool body 503 in sequence. The integrated knife flywheel 50 is detachably arranged on the eccentric assembly 40 through the through hole 504.

Referring to FIG. 12, a slope angle of the knife flywheel main body 501 is from 30 degrees to 70 degrees. In this embodiment, the slope angle of the knife flywheel main body 501 is 50 degrees. A guide angle 5021 is arranged on one side of the resisting slot body 502. The guide angle 5021 ranges from 5 degrees to 45 degrees. In this embodiment, preferably, the guide angle 5021 adopts 25 degrees. By such an angle design, the cutting operation of the cutting tool body 503 is more stable. A knife angle 5031 is arranged on a cutting surface of the cutting tool body 503. The knife angle 5031 is from 5 degrees to 25 degrees. In this embodiment, preferably, the knife angle 5031 is 15 degrees. In such an angle design, a cover cut by the cutting tool body 503 has fewer burrs, which effectively prevents injury of the burrs to the user.

Referring to FIG. 3 to FIG. 5, in this embodiment, the integrated knife flywheel 50 is detachably connected to the eccentric assembly 40 through a connection assembly 51. The connection assembly 51 includes a knife flywheel jack post 511 and two fastening screws 512. The knife flywheel jack post 511 penetrates through the integrated knife flywheel 50 through the through hole 504. The two fastening screws 512 are separately arranged on two sides of the knife flywheel jack post 511, so that the integrated knife flywheel 50 is detachably connected to the eccentric assembly 40.

Referring to FIG. 4 and FIG. 5, in this embodiment, the key assembly 60 includes a key plate 61 and a key shell 62. The key plate 61 is fixedly arranged in the shell assembly 10 and is electrically connected to the circuit board 20. The key shell 62 is arranged on the key plate 61 and penetrates through the shell assembly 10. The key shell 62 is pressed to drive a key on the key plate 61 to move, thereby achieving work and rotating speed adjustment of the speed reduction transmission assembly 30.

Referring to FIG. 4 and FIG. 5, in this embodiment, the battery assembly 70 adopts a polymer lithium ion battery. The battery assembly 70 is charged through the charging interface 80. In some embodiments, the battery assembly 70 can be a dry battery or a button battery pack. In some other embodiments, the battery assembly 70 may not be arranged. The can opener is electrically connected to an external power supply through cooperation between a plug and an adapter. The charging interface 80 may be one or more of a Micro USB interface, a Type-C interface, and a Lightning interface. In this embodiment, the charging interface 80 is the Type-C interface. In this embodiment, a magnet assembly 90 is arranged at a lower end of the shell assembly 10. The magnet assembly 90 includes a magnet fixing plate 91 and a magnet 92. The magnet fixing plate 91 is fixedly arranged at the lower end of the lower shell 11. The magnet 92 is fixedly arranged on the magnet fixing plate 91 in a penetrating manner, a function of which is to attract a can lid after cutting.

It should be noted that according to the can opener with the adaptation function of the present disclosure, the motor 31 drives the transmission gear 32 to rotate. The transmission gear 32 drives the speed reduction mechanism 33 to perform a speed reduction operation and a torsion moment increase operation. The speed reduction mechanism 33 drives the drive gear 34 to rotate. The drive gear 34 drives the traction wheel 443 in the gear shaft 44 to rotate. At the same time, the eccentric wheel 42 is driven to eccentrically rotate under the synchronous transmission action of the synchronizer gear 35. The eccentric wheel 42 drives the gear shaft 44 to be close to the integrated knife flywheel 50 in the sliding chute 431 through an eccentric force. The cutting operation on the can body is achieved by cooperation between the traction wheel 443 and the integrated knife flywheel 50.

The technical features of the embodiments described above can be arbitrarily combined. In order to make the description concise, all possible combinations of various technical features in the above embodiments are not completely described. However, the combinations of these technical features should be considered as the scope described in this specification as long as there is no contradiction in them.

The above-mentioned embodiments only express several implementation modes of the present disclosure, and their descriptions are more specific and detailed, but they cannot be understood as limiting the patent scope of the present disclosure. It should be noted that those of ordinary skill in the art can further make various transformations and improvements without departing from the concept of the present disclosure, and these transformations and improvements all fall within the protection scope of the present disclosure. Therefore, the protection scope of the patent of the present disclosure shall be subject to the appended claims.

What is claimed is:

1. A can opener with an adaptation function, comprising a shell assembly, which is a hollow cavity; a circuit board and a speed reduction transmission assembly which are separately arranged in the shell assembly; an eccentric assembly movably penetrating through the shell assembly, wherein the eccentric assembly is in meshing and transmission connection with the speed reduction transmission assembly; an integrated knife flywheel penetrating through the shell assembly and detachably arranged on the eccentric assembly, wherein the integrated knife flywheel comprises an integrally formed integrated knife flywheel main body, a resisting slot body, and a cutting tool body; the knife flywheel main body is in a slope design; the resisting slot body is an annular slot; the cutting tool body is a ring tool; a through hole penetrates through the knife flywheel main body, the resisting slot body, and the cutting tool body in sequence; and a key assembly arranged on the shell assembly in a penetrating manner and electrically connected to the circuit board;

wherein the speed reduction transmission assembly comprises a motor, a transmission gear, a speed reduction mechanism, a drive gear, and a synchronizer gear; the motor is arranged in the shell assembly; the transmission gear is fixedly arranged on a rotating shaft of the motor; the speed reduction mechanism is in meshing and transmission connection with the transmission gear; the drive gear is in meshing connection with the speed reduction mechanism and is connected to the eccentric assembly; and the synchronizer gear is in meshing connection with the drive gear and the eccentric assembly respectively; the eccentric assembly comprises an eccentric wheel and a gear shaft, the gear shaft is configured to passes through the eccentric wheel and the drive gear in sequence to allow the gear shaft to rotate along with the drive gear relative to the eccentric wheel; the synchronizer gear is in meshing connection with the eccentric wheel to allow the eccentric wheel to rotate along with the synchronizer gear.

2. The can opener with the adaptation function according to claim 1, wherein the speed reduction mechanism comprises a multi-reduction gear structure.

3. The can opener with the adaptation function according to claim 1, wherein the eccentric assembly comprises a fixed block and a limiting block; the fixed block is fixedly arranged in the shell assembly; the eccentric wheel movably penetrates through the fixed block; the limiting block is arranged on a side edge of the fixed block, and a sliding chute is formed in the limiting block in a penetrating manner; the gear shaft penetrates through the eccentric wheel, the fixed block, the limiting block, and a guide block in sequence and is connected to the drive gear; and the eccentric wheel drives the gear shaft to move in the sliding chute.

4. The can opener with the adaptation function according to claim 3, further comprising the guide block, wherein the guide block is movably arranged on a side edge of the limiting block and guides and limits the gear shaft.

5. The can opener with the adaptation function according to claim 4, wherein the gear shaft comprises a shaft sleeve, a rotating shaft main body, and a traction wheel; the shaft sleeve penetrates through the eccentric wheel, the fixed block, the limiting block, and the guide block in sequence; the rotating shaft main body is movably arranged on the shaft sleeve in a penetrating manner and is connected to the drive gear; and the traction wheel is fixedly arranged on one side of the rotating shaft main body.

6. The can opener with the adaptation function according to claim 3, wherein a plurality of racks are arranged on a side edge of the eccentric wheel; the plurality of racks are uniformly arranged; and the synchronizer gear is in meshing and transmission connection with the plurality of racks.

7. The can opener with the adaptation function according to claim 1, wherein the integrated knife flywheel is detachably connected to the eccentric assembly through a connection assembly; the connection assembly comprises a knife flywheel jack post and two fastening screws; the knife flywheel jack post penetrates through the integrated knife flywheel through the through hole; and the two fastening screws are separately arranged on two sides of the knife flywheel jack post.

8. The can opener with the adaptation function according to claim 1, further comprising a battery assembly, wherein the battery assembly is fixedly arranged in the shell assembly and is electrically connected to the circuit board.

9. The can opener with the adaptation function according to claim 8, wherein when the battery assembly is a rechargeable battery, the circuit board is provided with a charging interface; and the charging interface penetrates through the shell assembly to charge the battery assembly.

10. The can opener with the adaptation function according to claim 1, wherein the cutting tool body includes a first surface and a second surface, an angle between the first surface and the second surface is between 5° and 25°.

* * * * *